May 9, 1950     E. V. BROWN     2,507,090
TRACTION LUG
Filed Nov. 16, 1948     2 Sheets-Sheet 1
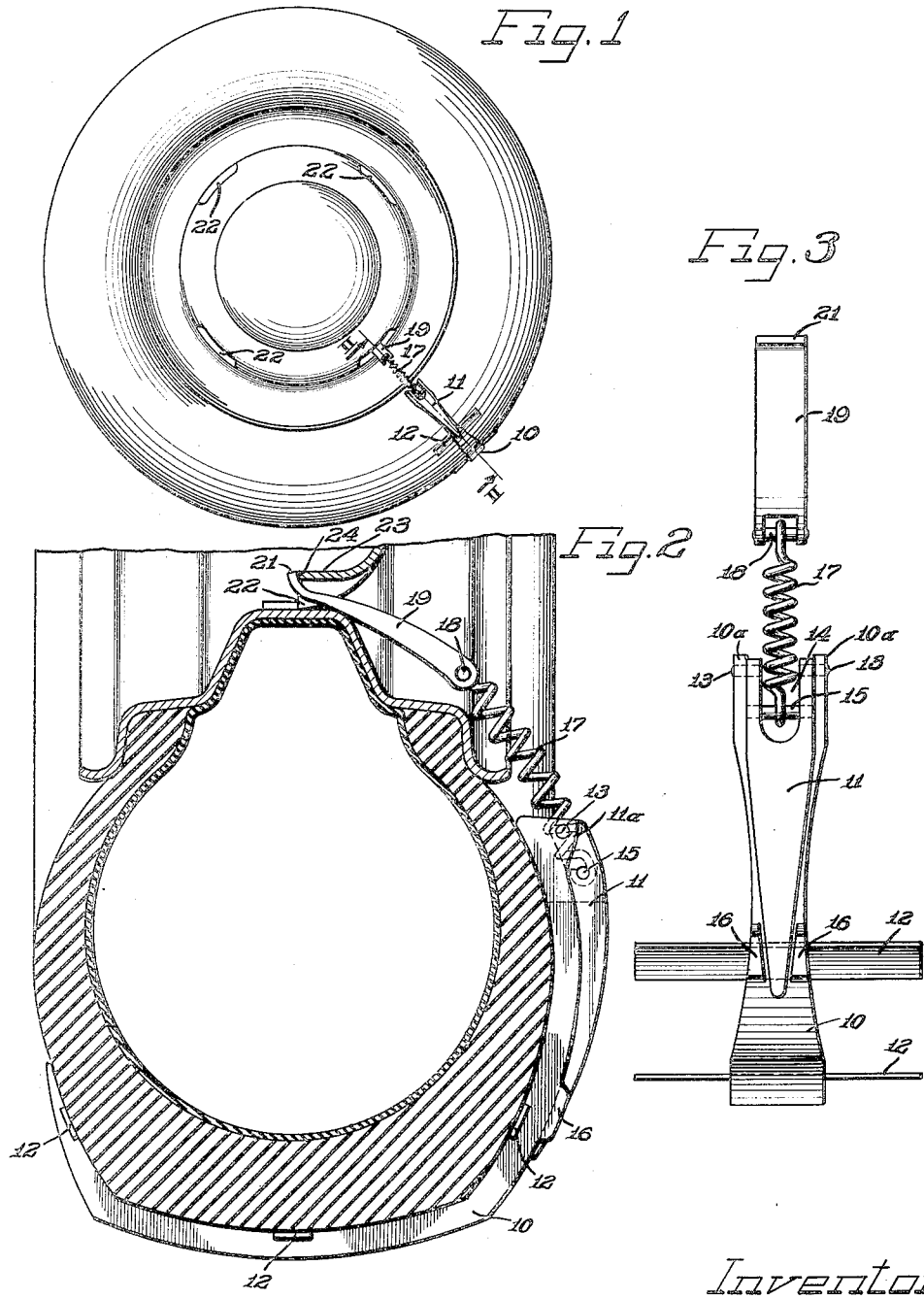
Inventor
Edmund V. Brown May 9, 1950     E. V. BROWN     2,507,090
TRACTION LUG
Filed Nov. 16, 1948     2 Sheets-Sheet 2
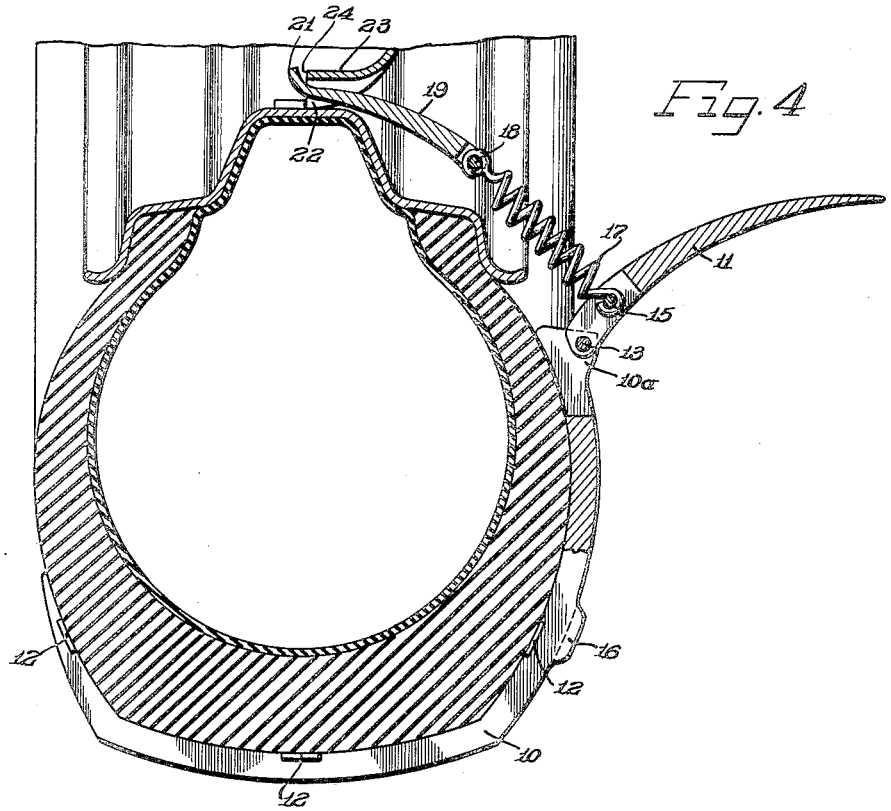
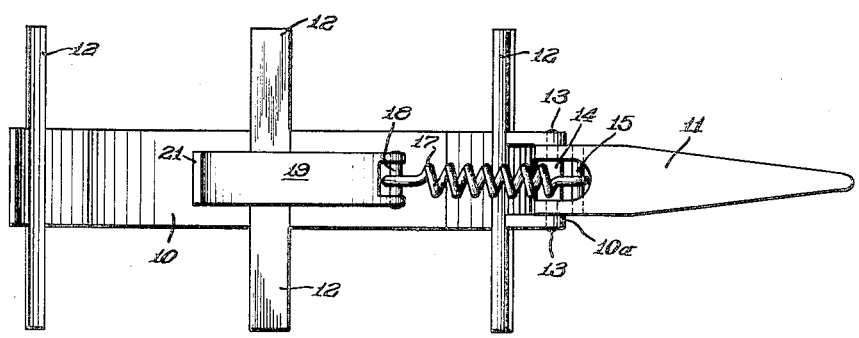
Inventor
Edmund V. Brown
By   Attys Patented May 9, 1950

2,507,090

UNITED STATES PATENT OFFICE 2,507,090

TRACTION LUG

Edmund V. Brown, St. Catharines, Ontario, Canada

Application November 16, 1948, Serial No. 60,213

8 Claims. (Cl. 152—225)

This invention relates to a device for increasing the traction of an automobile tire. More specifically, the invention relates to a demountable C-shaped lug which may be anchored to an automobile disk wheel through the chain slot thereof.

It is an object of this invention to provide a simple, effective and economical means of increasing the traction of an automobile tire and preventing the skidding thereof.

Another object of this invention is to provide an automobile tire traction lug which utilizes the chain slot of a disk wheel as an anchoring means.

Still another object of this invention is to provide a C-shaped lug for an automobile tire in which short bars seated in recesses across the inner face of the lug prevent damage to the tire.

A still further object of this invention is to provide an automobile tire lug which may be applied without the necessity of having the operator reach around behind the tire.

Other and further objects of the invention will become apparent to those skilled in the art from the following detailed description of the annexed sheets of drawings which disclose preferred embodiments of the invention.

On the drawings:

Figure 1 is a side elevational view of the outer side face of an automobile tire and wheel assembly with the device of this invention affixed thereto;

Figure 2 is an enlarged cross-sectional view with parts in elevation taken along the line II—II of Figure 1 and showing the device of this invention in operating position;

Figure 3 is a front elevational view of the device illustrating the pivots for the lever arm and spring and showing the lever arm in locked or closed position;

Figure 4 is a view similar to Figure 2 but illustrating the manner in which the device is applied to or removed from a tire by manipulation of the conveniently disposed lever arm; and Figure 5 is a top view of the device in the position illustrated in Figure 4 but with the tire and wheel omitted.

As shown on the drawings:

The traction portion of the device consists of a C-shaped lug 10. This lug 10 preferably conforms to the outer cross-sectional contour of the tire as shown in Figures 2 and 4. It extends radially outward along the outer side wall of the tire from a point near the rim of the wheel, thence transversely across the tread of the tire, and then radially inward along the inner side wall of the tire for a relatively short distance.

This C-shaped lug is preferably provided with transverse grooves across its inner face in the region thereof overlying the tread and side walls of the tire adjacent the tread. Short bars 12 are secured in these grooves to extend beyond the C-lug to prevent the lug 10 from digging into the tire casing.

The end of the lug portion overlying the outer side wall of the tire is bifurcated and a lever arm 11 is pivotally mounted in the bifurcated end between ears 10a thereof. Thus pivot pins 13 form the pivot connection. A U-shaped recess 14 in the lever arm 11 has a spring anchor pin 15 mounted therein. When the lever arm 11 is swung to overlie the C-shaped lug 10, it is protected between guides 16 on the C-shaped lug 10.

A tension spring 17 extends from the spring anchor pin 15 in the lever arm 11 to a similar spring anchor pin 18 in a locking bar member 19. The locking bar 19 has a curvature which continues the curvature of the C-shaped member 10. Opposite the end of the locking bar 19 which contains the pin 18 is located an outturned flange or rib 21.

Since conventional automobile disk wheels have chain slots 22 punched therein which are suitable for the anchoring means illustrated in the drawings and since these slots have inwardly turned side walls 23 whose edges 24 form convenient rigid shoulders 24, the lug 19 of the device is easily inserted through a slot 22 and its rib 21 can easily engage the adjacent shoulder 24.

In operating the device illustrated, the C-shaped lug 10 is placed around an automobile tire, the lever arm 11 is opened to the position shown in Figure 4 and the end of the locking bar 19 is inserted in a chain slot 22 of an automobile disk wheel as illustrated in Figure 4. The spring 17 is then loaded by swinging the lever arm 11 against the C-shaped lug 10. In swinging the lever arm 11 toward the C-shaped lug 10, the spring anchor pin 15 is rotated around the pivot pin 13 to stretch the spring and pull the rib 21 against the shoulder 24. As shown in Figure 2 the direction of pull of spring 17 is on the tire side of the axis of the pivot pin 13 when the lever arm 11 is placed against C-shaped lug 10 and the spring 17, after the pin 15 is rotated beyond the pins 13, tends to maintain the lever arm 11 in place. During rotation of the wheel, centrifugal force also aids to maintain the lever arm 11 in locking position.

The operating position of the device is illustrated in Figure 2. The lever arm 11 is now pressed against the C-shaped lug 10, and tension in the spring 17 pulls the rib 21 of the locking bar 19 in against the shoulder 24 of the selected chain slot 22 of the wheel.

It may be seen that the device of this invention provides a readily mountable lug for increasing the traction of a tire. The lug may be attached and removed without reaching behind the tire.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A traction lug adapted for rubber tired disk wheels having chain slots at spaced intervals around the disk thereof which comprises a rigid metal strip of C-shape configuration having a leg for overlying the outer side wall of the tire, a base for extending transversely across the tread of the tire, and a second leg for overlying the inner side wall of the tire adjacent the tread portion thereof, said leg for overlying the outer side wall of the tire having a bifurcated end, a lever having a recessed end projecting into said bifurcated end of the leg, pivot pins connecting the recessed end of the lever to the bifurcated end of the leg, a spring anchor in the recess of the lever spaced from said pivot pins, a tension spring swingably mounted on said anchor and projecting through said recess, a locking bar swingably mounted on the other end of said spring, an outturned flange on said locking bar, said locking bar being adapted to project through a chain slot of a disk wheel and said flange being adapted to engage a wall of said chain slot, and said lever being swingable about said pivot pins to stretch the spring for clamping the strip on the tire when the locking bar is engaged in the chain slot.

2. A traction lug adapted for rubber tired disk wheels having chain slots at spaced intervals around the disk thereof which comprises a rigid metal strip of C-shape configuration having a leg for overlying the outer side wall of the tire, a base for extending transversely across the tread of the tire, and a second leg for overlying the inner side wall of the tire adjacent the tread portion thereof, a short bar seated in a recess in the inner face of said strip, said bar being approximately at right angles to said strip, said leg for overlying the outer side wall of the tire having a bifurcated end, a lever having a recessed end projecting into said bifurcated end of the leg, pivot pins connecting the recessed end of the lever to the bifurcated end of the leg, a spring anchor in the recess of the lever spaced from said pivot pins, a tension spring swingably mounted on said anchor and projecting through said recess, a curved locking bar swingably mounted on the other end of said spring, an outturned flange on said locking bar, said locking bar being adapted to project through a chain slot of a disk wheel and said flange being adapted to engage a wall of said chain slot, and said lever being swingable about said pivot pins to stretch the spring for clamping the strip on the tire when the locking bar is engaged in the chain slot.

3. An anti-skid device for an automobile tire comprising a C-shaped lug conforming to the cross-sectional contour of said tire, a plurality of short bars seated in recesses in the inner face of said lug, said bars being approximately at right angles to said lug, a lever pivoted on one end of said lug, said lever conforming to the contour of said lug, a U-shaped recess in the pivot end of said lever, a pin mounted in said recess a short radial distance from the lever pivot pin, a locking bar, a pin in one end of said bar, a tension spring connecting the pin of said bar with the pin of said lever, said tension spring and lever cooperating to increase the tension on said bar, and an outturned rib on the free end of the bar for attachment to the shoulder of a chain slot of an automobile wheel.

4. A traction lug for an automobile tire comprising a C-shaped metal piece disposed to wrap around said tire, a plurality of short bars seated in recesses across the inner face of said C-shaped metal piece, a lever bar pivoted on one end of said C-shaped metal piece, said lever bar lying against the outside of said C-shaped metal piece at one extreme pivot position, a U-shaped recess in the pivot end of said lever bar in which is mounted a pin, a locking bar containing the curvature of the C-shaped metal piece and having a recess in one end in which is mounted a pin, a tension spring connecting the pin of said locking bar to the pin of said lever bar, said spring cooperating with said lever bar to maintain tension on said locking bar when said lever bar is swung next to said C-shaped metal piece, and an outturned tip at the end of said locking bar opposite said tension spring, said outturned tip serving to anchor said locking bar to the chain slot of an automobile wheel.

5. A device for increasing the traction of an automobile tire comprising a short metal locking bar with a slight curvature having a tip with pronounced curvature in the opposite direction, said tip serving to anchor said locking bar in the chain slot of an automobile disk wheel, a tension spring attached to the end of said bar opposite the tip with reverse curvature, a C-shaped lug disposed to continue the curvature of said bar, said C-shaped lug conforming in shape to the outer side wall, the tread, and a portion of the inner side wall of a tire, a lever arm pivoting from the outer side wall end of said C-shaped lug, said lever arm conforming in contour to said C-shaped lug and having a pin displaced radially a short distance from its pivot point, and a tension spring joining the pin of said lever arm to the pin of said short metal piece.

6. A device for increasing the traction available to an automobile tire comprising a C-shaped lug disposed to extend from the outer side wall of a tire across the tread and part of the distance up the inner side wall of said tire, a pivot pin mounted on said C-shaped lug at the outer side wall end thereof, a lever bar pivoted on said pivot pin, a locking bar disposed to continue the curvature of said C-shaped lug above the outer side wall end thereof, said locking bar having a pronounced reverse curvature portion at its remote tip for insertion in a disk wheel chain slot, and a tension spring connecting the near end of said locking bar to said lever bar, said lever bar connection being removed a short distance from the pivot axis so that manipulating the lever bar away from said locking bar increases the tension on said spring.

7. A device for improving the traction available to an automobile tire comprising a C-shaped lug disposed to extend from the outer side wall of a tire across the tread and part of the distance up the inner side wall of said tire, a locking bar disposed to continue the curvature of said C-shaped lug above the outer side wall end thereof, an outturned tip on the remote end of said locking bar for insertion in an automobile disk wheel chain slot, and a tension spring connecting the near end of said locking bar and said C-shaped lug.

8. A device for improving the traction available to an automobile tire comprising a C-shaped lug disposed to extend from the outer side wall of a tire across the tread and part of the distance up the inner side wall of said tire, a plurality of short bars seated in recesses across the inner face of said C-shaped lug, a locking bar disposed to continue the curvature of said C-shaped lug above the outer side wall end thereof, said locking bar having a pronounced reverse curvature portion at its remote tip for insertion in an automobile disk wheel chain slot, and a tension spring connecting the near end of said locking bar and said C-shaped lug.

EDMUND V. BROWN.

REFERENCES CITED

The following references are of record in the file of this patent:

UNITED STATES PATENTS

| Number | Name | Date |
|---|---|---|
| 1,574,791 | Clark | Mar. 2, 1926 |
| 1,869,298 | Borgstrom | July 26, 1932 |